United States Patent [19]

Walter et al.

[11] Patent Number: 4,635,331
[45] Date of Patent: Jan. 13, 1987

[54] METHOD FOR THE PRODUCTION OF A GUIDE RAIL

[75] Inventors: Lothar Walter, Schweinfurt; Walter Reith, Bad Bocklet, both of Fed. Rep. of Germany

[73] Assignee: SKF Kugellagerfabriken GmbH, Schweinfurt, Fed. Rep. of Germany

[21] Appl. No.: 561,188

[22] Filed: Dec. 14, 1983

[30] Foreign Application Priority Data

Dec. 16, 1982 [DE] Fed. Rep. of Germany ....... 3246626

[51] Int. Cl.$^4$ .............................................. B21D 53/12
[52] U.S. Cl. ........................ 29/148.4 R; 29/149.5 DP; 29/725
[58] Field of Search ......................... 72/224, 225, 366; 29/149.5 R, 149.5 DP, 148.4 R, 724, 725; 148/149; 308/34, 3 R, 6 C, 6 R

[56] References Cited

U.S. PATENT DOCUMENTS 1,319,141 10/1919 Dieter .............................. 72/224 X
3,934,946 1/1976 Burr et al. ............................. 308/6 C
4,126,361 11/1978 Böttner et al. ................. 308/6 R X

FOREIGN PATENT DOCUMENTS 47-14613 1/1972 Japan ................................... 148/149

Primary Examiner—Howard N. Goldberg
Assistant Examiner—P. W. Echols
Attorney, Agent, or Firm—Rosen, Dainow & Jacobs

[57] ABSTRACT

A method for the production of a guide rail for linear guiding and having a hardened rolling body race groove on opposite sides of the guide rail. In order to minimize production costs and avoid cutting of the race grooves, the race grooves are initially spaced at a distance that is greater or smaller than their finally desired value, by an incremental distance. Grooves are provided centrally in the guide rail between the opposed race grooves, and the race rail is then hardened except in the region of the central grooves. Compression rollers in the race grooves or central grooves are then forced into the guide rail to decrease or increase respectively the distance between the race grooves until the desired distance therebetween is obtained. The method can also be employed when only a single race groove is provided on the rail.

8 Claims, 4 Drawing Figures

METHOD FOR THE PRODUCTION OF A GUIDE RAIL

FIELD OF THE INVENTION

This invention relates to a method for the production of a guide rail for linear guides, in which at least one hardened rolling body race groove is provided on each of a pair of opposed sides of a guide rail or, alternatively, in which a hardened rolling body race groove is provided on only one side of the guide rail.

BACKGROUND OF THE INVENTION

The production of guide rails up to now, has included first providing rolling body race grooves on opposite sides of a solid guide rail. Then the guide rail is hardened. Finally, the race grooves must be precisely machined for the removal of material to compensate for production tolerances and/or hardening distortion, in order to obtain the necessary final dimension for proper functioning of the linear guide.

The known process results in high production costs and production time as well as apparatus costs, especially in view of the necessary step of final machining of the race grooves. The present invention is therefore directed to the provision of a method which overcomes the above disadvantages of the known process and wherein, in particular, production costs, expenditure of time, as well as apparatus cost are minimized.

SUMMARY OF THE INVENTION

In accordance with the invention, the above objects are achieved by providing a method in which the opposed race grooves are initially produced with a spacing that differs from the final spacing A by a determined dimension x. The central cross section of the guide rail between the opposed race grooves has a reduced dimension at right angles to the connection line between the bottom of the race grooves. The guide rail is then hardened except in the cross-sectional region of reduced thickness. Finally, the guide rail is compressed by compression tools inserted in the opposed race grooves until the final distance A of the race grooves from one another is achieved.

The invention achieves the above objects in an especially simple manner. Since, in accordance with the invention, the initial distance between the bottoms of the race grooves is different from that of the final desired spacing, and the spacing is brought to the desired dimension following hardening of the guide rail, by means of compression tools, the invention does not require the cutting of the race grooves to achieve the desired precision. In order to render the step of compression by pressure tools more simple, the guide rail is produced with a central region of reduced thickness, this region not being hardened in the process of hardening the guide rail. It is therefore apparent that a guide rail may be advantageously produced in accordance with the invention from a continuous sheet metal. Simultaneously hardening distortions and/or other undesired production and material tolerances, such as variation in sheet metal thickness or width, can be rendered ineffective to the desired degree by the final step of compression by means of a pressure tool. The invention thereby enables the production of a guide rail having precisely parallel and accurately spaced race grooves throughout its whole length, in an especially simple manner.

It is advantageous to provide opposed grooves at the central portions of the sides of the guide rail on which the race grooves are not provided, so that the guide rail has a central section of reduced thickness. These grooves make it possible to obtain a uniform reduction in cross section and to prevent hardening of the central region of the guide rail in a simple manner by covering this region with an insulating material.

In an especially advantageous arrangement in accordance with the invention, the distance between the opposite race groove bottoms before hardening of the guide rail is chosen to have a dimension that exceeds the desired final spacing A by a small incremental distance x. After hardening of the guide rail, pressure tools are moved toward one another while arranged in the race grooves, until the distance between the bottoms of the race grooves is reduced to the desired final value A. This method in accordance with the invention is suitable for the production of all types of guide rail in which the spacing between opposite race grooves has small to medium values. This embodiment requires an especially small amount of equipment for its practice, since only one pair of opposed pressure tools, arranged in the race grooves, is necessary.

In a further advantageous method in accordance with the invention the distance between the bottoms of the race grooves, before hardening, is selected to be less than the desired end value A by a small distance x. After hardening, first pressure tools in the race grooves are held at a constant distance A from one another, while simultaneously second pressure tools arranged in the opposite central grooves are moved together until the distance of the bottoms of the race grooves is increased to the desired end value A. This method, in which second pressure tools are additionally arranged in the central grooves, is suitable for the production of all guide rails in which the distance of the race grooves from one another has larger values. The additionally employed second pressure tools provide stabilization of the entire arrangement, especially during the last process step, i.e., in the compression of the guide rails for realizing the desired distance between the race grooves.

In accordance with a modification of the invention, the race grooves are comprised of race inserts of a hard material connected to a guide rail body made of a relative easily deformable material, the initial distance between the bottoms of the race grooves being selected to be slightly larger than the desired end value A by a small distance x. Subsequently the first pressure tools located in the race grooves are moved toward one another until the spacing between the race grooves is reduced to the desired end value A. Since prehardened (preferably steel) race inserts are used in this embodiment of the invention in combination with a relatively easily deformable guide rail body (for example, made of aluminum or the like), the race grooves can be pressed to the desired final value directly thereafter, by the application of the corresponding compression forces to the race inserts, which forces in turn compress the guide rail body. As opposed to the previously described embodiments of the invention, in accordance with this method it is not necessary to provide grooves on those sides of the guide rail which are not provided with race grooves. The joining of the race inserts to the guide rail body can be effected in various simple manners, for example, the race insert can be positioned in a die with the material of the guide rail body being injection-molded thereabout. Alternatively the guide rail body can be produced in a continuous casting process, the race insert being thereafter inserted in the casting and the castng material being rolled to hold the inserts in place.

In an apparatus in accordance with the invention for producing the guide rails, first and second pressure tools are provided, advantageously in the form of pressure rolls having cross-sectional shapes at their circumferential edges which correspond with the cross-section of the race grooves and central grooves of the guide rail respectively. This arrangement in accordance with the invention enables the advantageous continuous pressing of the guide rail in a simple manner for the purpose of producing the desired final spacing between the opposed race grooves.

In the same sense, advantageously the second pressure tools in the opposed grooves are arranged at the same axial level, with respect to the guide rail, as the first pressure tools in the race grooves.

In practice, linear guide rails are occusionally provided in which only one rolling body race is required. The invention also essentially encompasses corresponding guide rails having race grooves on only one side, in which the opposite surface of the guide rail comprises, for example, a mounting surface for the guide rail. The method of the invention is also advantageously used in a similar manner especially for the production of a guide rail of such type in which a race rail in the form of a hardened insert is provided in a guide rail body of a relatively easily deformable material. The final assembly of a guide rail of this type can be effected in a simple manner by means of mounting grooves which are screwed either in the above-noted flat side or in a threaded hole in a side of the guide rollers extending at right angles thereto.

BRIEF DESCRIPTION OF THE DRAWINGS

In order that the invention may be more clearly understood, it will now be disclosed in greater detail with reference to the accompanying drawings, wherein.

DETAILED DESCRIPTION OF THE PREFERRED EMBODIMENT

Figure 1:
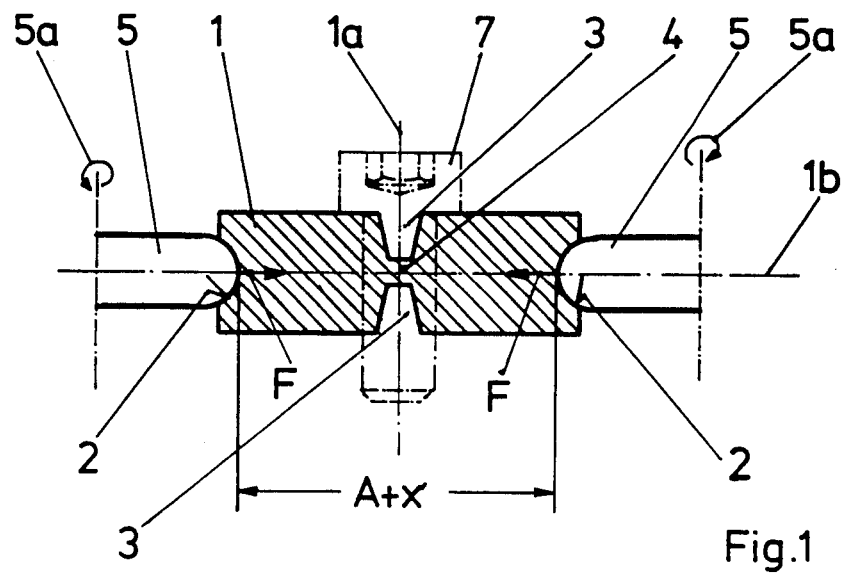
FIG. 1 is a cross-sectional view of a guide rail and illustrating one method for compressing the guide rail to obtain the desired spacing between the race grooves, in accordance with the invention.

Referring now to FIG. 1, therein is illustrated a sheet metal guide rail 1 for the linear guiding of a rectangular section element (not shown), with the guide rail having mirror image symmetry about the central axes 1a and 1b. The grooves 2 are provided on opposite ends of the guide rail for linearly guiding rolling bodies in the form of balls.

Centrally located grooves 3 are formed in the upper and lower sides of the guide rail 1, between the ends thereof, at the same time as the production of the race grooves 2. The length of the grooves 3 in the direction perpendicular to the plane of the drawing corresponds to the length of the race grooves 2 in the same direction. The grooves 3 thereby produce a cross-sectional central region 4 of the guide rail 1 having reduced thickness.

In this form of guide rail, the distance between the bottoms of the opposite race grooves 2 has a dimension A+x, wherein A is a desired final distance between the bottoms of the race grooves of the finished guide rail and the dimension x is a determined enlargement amount for this distance of about 0.2 millimeter.

The central portion of the thus formed and dimensioned guide rail 1 is next covered, for example, by the application thereto of a mass of insulation material. Then the guide rail 1 is hardened. Since the central region 4 is covered by the insulating mass during the hardening process, this central region is not hardened, and thereby remains relatively easily workable. On the contrary, however, the race grooves 2 now have the desired hardening.

In order to bring the distance between the opposite race grooves 2 to the desired final dimension, in the final process step, in order to move the race grooves toward one another, a hardened pressing tool 5 is inserted in each of the race grooves, to apply a compressive force to the guide rail 1. The force F is applied by the pressing tools from opposite directions until the distance between the race grooves 2 has decreased to the final desired value A. The compression of the guide rail 1 is rendered possible by the fact that the central region 4 of the guide rail had not been hardened.

Figure 4:
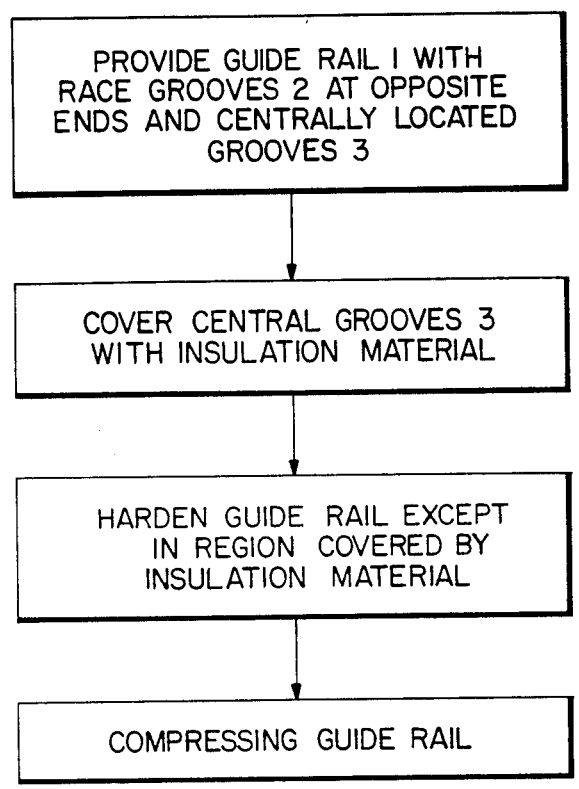
FIG. 4 is a block diagram illustrating a method in accordance with the invention.

The above-described method in accordance with the invention is illustrated in the block diagram of FIG. 4.

The compressing of the guide rail until the desired spacing value A is achieved obviously occurs over the entire length of the guide rail. Therefore the pressure tool 5 advantageously is formed as a pressure roll whose circumferential edge has a cross section which corresponds to the cross section of the receiving race groove 2 in the guide rail 1. The pressure rolls 5 move about their turning axes illustrated by the turning arrows 5a, so that the guide rail 1 moves further in the direction perpendicular to the plane of the drawing. As a consequence this final process step may be continuous, so that finally a guide rail is produced in which the parallel race grooves 2 have a precise spacing A throughout the length thereof.

Figure 2:
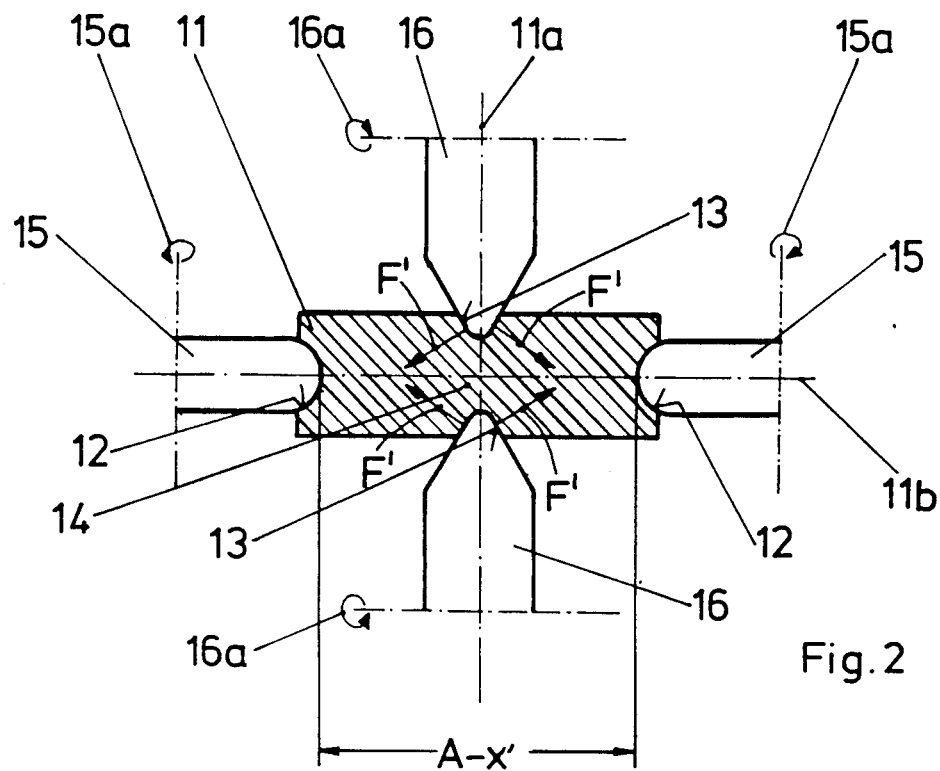
FIG. 2 is a cross-sectional view of a guide rail illustrating an alternative method in accordance with the invention for compressing the guide rail to obtain the desired spacing between the race grooves.

The same results are achieved in the modification of the invention according to FIG. 2, which differs from the embodiment of FIG. 1 only as noted in the following description. In FIG. 2, parts corresponding to the parts of FIG. 1 have reference numerals increased by the value 10.

The basic difference between the process and arrangements of FIG. 2 and those of FIG. 1 resides in the fact that the guide rail 11, after its production, has a spacing between the bottoms of the race grooves 12 equal to A−x, wherein A is the desired final spacing of the finished guide rail and x is a reducing value of, for example, 0.2 millimeter.

In this embodiment of the invention the spacing of the race grooves 12 from one another is increased by the distance x to the value A after the hardening of the guide rail 11. In this arrangement, the first pressure rolls 15 are separated by a constant distance A and arranged in the race grooves 12 and second pressure rolls corresponding to one another are adapted to move in the receiving grooves 13. As a consequence the forces F' acting on the guide rail 11 thereby increase the distance between the race grooves 12 from one another, to the end value A.

For completeness it is noted that also the second pressure rollers 16, whose circumferential sections correspond in each case to the receiving grooves 13 of the guide rail 11, likewise rotate as shown by the turning arrows 16a. The turning directions 15a and 16a are in the same sense, so that the guide rail 11 moves in a direction perpendicular to the plane of the drawing in this last process step. The described expansion of the race groove distance is continuous until the desired value A over the entire length of the race groove 12 is achieved. In the arrangement according to FIG. 2 the first pressure rolls 15 and the second pressure rolls 16 in the longitudinal direction of the guide rail 11 have the same height.

As illustrated in dash-dot lines in FIG. 1, the guide rails 1 (and 11 of FIG. 2) are finally fastened to a receiving part (not shown) advantageously by means of several centrally arranged screws 7. The screws 7, which are distributed uniformly along the length of guide rails 1 and 11, engage the two guide rail edges adjacent the grooves 3 and 13 directly with their screw heads, or if smaller-headed screws are used, by means of correspondingly larger washers (not illustrated). As a consequence the central weak portions of the guide rails 1 and 11 are effectively relieved in the regions of the grooves 3 and 13. In addition, this arrangement also insures that forces occurring during later use on the inner guide rail can bring about only small changes in the final spacing dimension A.

In the embodiment of the invention described above, with respect to FIGS. 1 and 2, the process may proceed continuously and automatically from the production of the guide rail up until the final achievement of the precise spacing distance A. These advantages are also true of the modified arrangement according to FIG. 3. The process of FIG. 3 differs from that of the previously described FIGS. 1 and 2 in that previously hardened inserts 28 having the race grooves 22 and made, for example, of tool steel or deep-drawn band steel, are connected to a relatively easily workable guide rail body 21 made, for example, of aluminum. In the illustrated embodiment of the invention the race inserts 28 are inserted in a corresponding form and the guide rail body 21 is formed thereabout by injection molding for example, aluminum in a die casting process.

The dimensions of the mold are so chosen that the distance between the bottoms of the race grooves corresponds to the value A+x in accordance with the embodiment illustrated in FIG. 1. Directly thereafter the spacing between the race grooves 22 is brought precisely to the desired value A by the compression of the rail by means of the pressure rolls 25.

Figure 3:
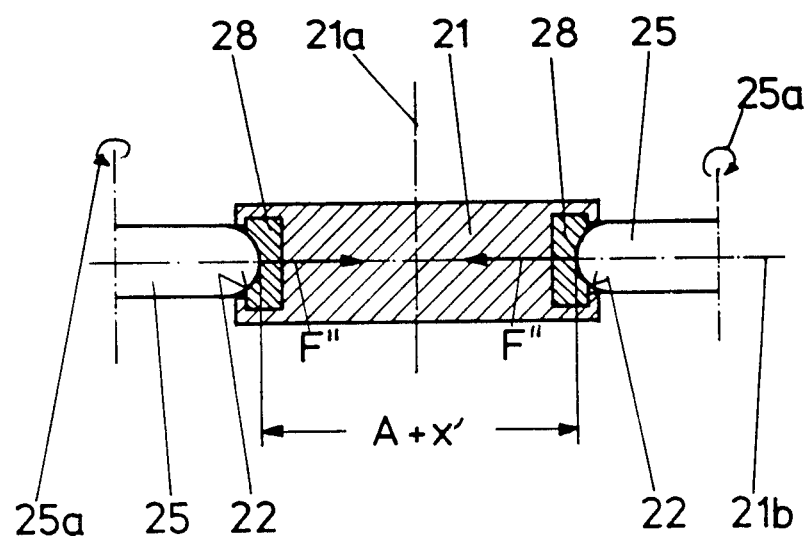
FIG. 3 is a cross-sectional view of a modified guide rail having hardened race inserts embedded in a guide rail body, and illustrating a further method for producing the desired distance between the race grooves in accordance with the invention.

In addition to the above-described advantages, the process in accordance with FIG. 3 has the advantage that the guide rail is comprised primarily of inexpensive steel and light aluminum.

While the invention has been disclosed and described with reference to a few embodiments, it will be apparent that variations and modifications may be made therein and it is therefore intended in the following claims to cover each such variation and modifications as falls within the true spirit and scope of the invention.

What is claimed is:

1. A method for production of a guide rail for linear guides, wherein at least one hardened linear race groove for rolling bodies is provided on each of a pair of opposite sides of the guide rail, the race grooves being parallel, the bottoms of said grooves being spaced apart a given distance along the connection line of minimum length between the bottoms of the groove; the improvement comprising initially spacing the bottoms of said race grooves to have a spacing along said connection line that differs from their ultimate desired dimensions A by an incremental dimension x, the central section of the guide rail between the race grooves having an elongated recessed region of reduced thickness along a plane normal to said connection line between said race grooves, said recessed region extending coextensively with and for the total length of said grooves, said plane being equally spaced from said bottoms of said grooves on opposite sides of said rail, said thickness being measured at right angles to said connection line, thereafter hardening the guide rail except in said recessed region and finally compressing the rail in a direction substantially perpendicular to said plane until the race grooves are separated by the final desired dimension A, by means of first pressing tools positioned respectively in said pair of opposing race grooves.

2. The method of claim 1 wherein said guide rail is provided with grooves in said central section on opposite sides of said guide rail to define said reduced thickness region, said grooves in said central section being arranged on respective sides of said first plane, and further comprising covering said opposite central grooves with an insulation material before hardening the guide rail.

3. The method of claim 2 wherein the distance between the race grooves before the hardening of the guide rail is larger than the final desired distance A by the dimension x, said step of compressing comprising urging said first pressure tools toward one another while engaging said race grooves, until the distance between the race grooves is reduced to the end value A.

4. The method of claim 2 wherein the distance between the opposite race grooves before hardening of the guide rail is set to a dimension x less than the final distance A, said step of compressing comprising moving second pressure tools engaging said opposite central grooves toward one another while holding the first pressure tools at a constant spacing A in the race grooves, until the distance between the race grooves is enlarged to the final desired value A.

5. In a method for the production of a guide rail for linear guides in which at least one hardened rolling body race groove is provided, the improvement wherein race grooves are formed of race inserts of hardened material held by a guide rail body of substantially easily workable material more easily workable than said hardened material, with the distance between the opposite race grooves being slightly larger than a desired distance A by a dimension x, and thereafter moving compression tools in the race grooves until the distance between the race grooves is reduced to the dimension A.

6. A method for the production of a rail for a linear guide for rolling bodies, wherein a linear groove is provided extending along a first edge of said rail in a first given plane, said rail having a second edge opposite said first edge and in said first plane; said method comprising providing a pair of elongated recesses on opposite sides of said rail, spaced from said first and second edges and extending coextensively with said linear groove, then hardening said first edge in the region of said linear groove without hardening said rail in the region of said elongated recess, and then compressing said rail in a direction parallel to said plane by urging a compression roller in said linear groove to reduce the distance between said first and second edges to a determined dimension.

7. A method for the production of a rail for a linear guide for rolling bodies, wherein a linear groove is provided extending along a first edge of said rail in a first given plane, said rail having a second edge opposite the first edge and in said first plane; said method comprising providing a pair of elongated recesses on opposite sides of said rail, spaced from said first and second edges and extending coextensively with said linear groove, then hardening said first edge in the region of said linear groove without hardening said rail in the region of said elongated recesses, and then compressing said rail in a direction normal to said plane by urging opposed compression rollers in said elongated recesses to increase the distance between said first and second edges to a determined dimension.

8. A method for the production of a rail for a linear guide for rolling bodies, wherein a linear groove is provided extending along a first edge of said rail in a first given plane, said rail having a second edge opposite the first edge and in said first plane; said method comprising providing an insert in said first edge of said rail of a material that is harder than a material of said rail, to define a linear race for rolling bodies, said insert defining said linear groove, and then compressing said rail in a direction parallel to said plane by urging a compression roller in said groove to reduce the distance between said first and second edges to a determined dimension.

* * * * *